Feb. 7, 1961  R. M. KENDIG  2,970,473
TEMPERATURE COMPENSATED GAS FLOW METER
Filed May 21, 1957
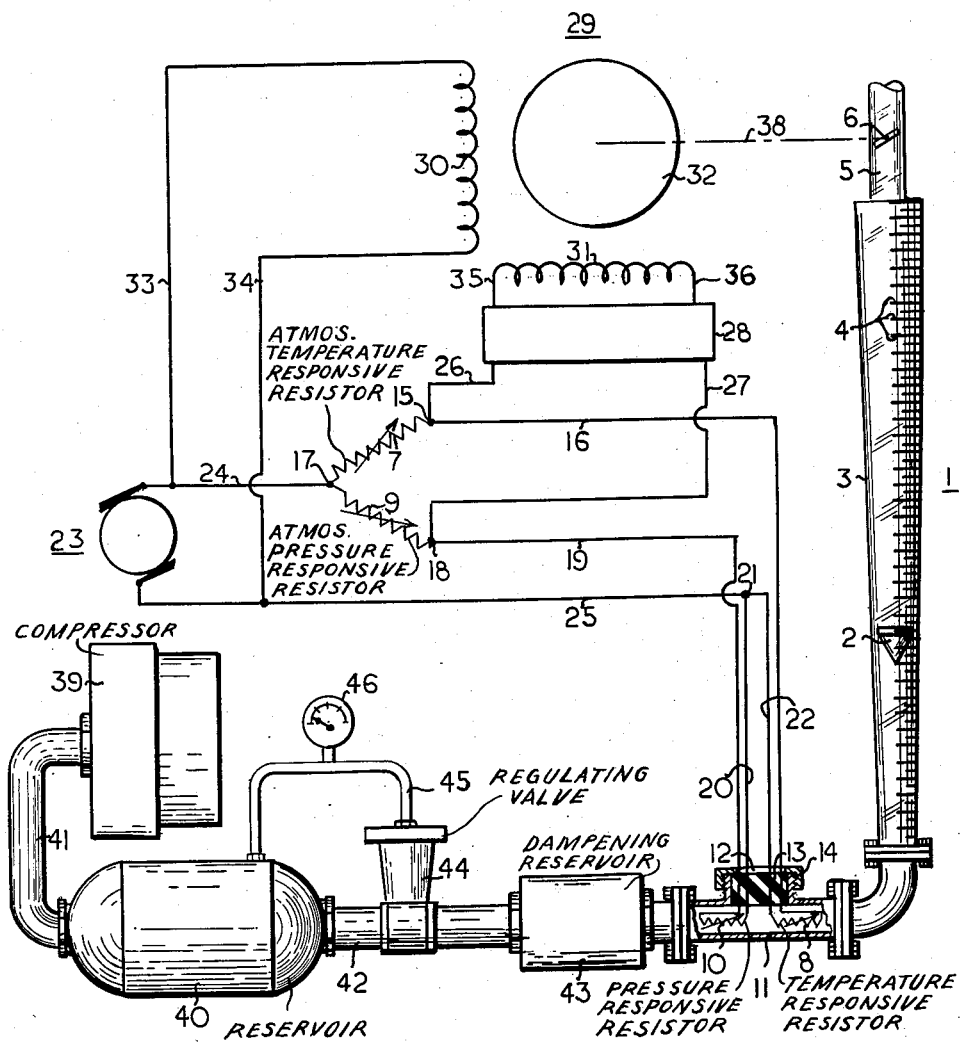
INVENTOR.
Robert M. Kendig
BY
Adelbert A. Steinmiller
Attorney 2,970,473
Patented Feb. 7, 1961

2,970,473
TEMPERATURE COMPENSATED GAS FLOW METER

Robert M. Kendig, Trafford, Pa., assignor to Westinghouse Air Brake Company, Wilmerding, Pa., a corporation of Pennsylvania Filed May 21, 1957, Ser. No. 660,588

3 Claims. (Cl. 73—209)

This invention relates to gas flow meters and more particularly to air flow meters having means compensating for variations in temperature of the air being measured.

A modern method for determining the volumetric efficiency of an air compressor is to operate the compressor against a volume charged with air at a given pressure and then manually controlling the flow of air under pressure from said volume to atmosphere or a second volume while noting various factors such as flow time, number of compressor revolutions, pressure changes et cetera as indicated by different gauges and meters. With the mentioned various factors known, calculations (not necessary to an understanding of the present invention) can be made to derive efficiency ratings for the compressor being tested.

One of the measurements taken in the mentioned test and in other tests, is that of the air compressed when the compressor is working against a given pressure load, said measurement being accomplished by a flow meter. In making the above-described test, the temperature of the air flowing through the flow meter is of higher degree than the temperature of the air at the intake to the compressor, thereby resulting in an expansion of air to cause an increase in the reading indicated by the flow meter. This increase in flow meter reading results in some inaccuracy in the efficiency rating calculation and therefore compensation of some kind is necessary if accuracy of efficiency calculations is to be obtained.

According to the invention, there is provided in association with a flow meter, a Wheatstone bridge arrangement of four resistance branches, in two of which the resistance value is varied responsively to atmospheric temperature and pressure respectively, and in the other two of which the resistance values are varied responsively to flow meter inlet temperature and pressure respectively. An unbalance of the resistance values of the branches of the Wheatstone bridge caused by changing resistance value of one branch thereof due to pressure or temperature changes, is effective to establish a potential resulting in current flow in the Wheatstone bridge to operate a servo amplifier which in turn effects operation of a servomotor to control the rate of air discharge from the flow meter such that regulation of the flow meter temperature and pressure values is effected to cause rebalance of the bridge. In that the flow meter indicator readings are correct only when the bridge is balanced, a direct indicator reading may be taken with air temperature variations automatically compensated for as long as the Wheatstone bridge is balanced.

It is the primary object of my invention to provide a flow meter, for obtaining an indication of rate of flow of a gas, such as air having means whereby temperature variations in the gas being measured is automatically compensated for.

It is also an object of my invention to provide an automatic temperature compensating means utilizing a Wheatstone bridge arrangement for so controlling the flow of gas, such as air, through a flow meter as to cause accurate flow readings to be registered directly on said flow meter, without necessitating temperature compensating calculations.

Still another object of my invention is to provide a means for automatically controlling the flow of a gas, such as air, through a flow meter responsively to pressure and temperature variations of gas delivered to said flow meter for causing the flow meter to register accurately the rate of flow of gas therethrough.

Other objects and advantages of my invention will appear from the following detailed description of the invention taken in connection with the accompanying single drawing which is a diagrammatic view partly in section and partly in outline of an air compressor test apparatus embodying the present invention to obtain a direct flow meter indication.

Description

In the drawing the novel temperature compensated flow meter comprising the invention is illustratively shown in connection with an air compressor test apparatus comprising in combination the flow meter with temperature compensating means and compressor apparatus. The flow meter 1 consists of a float or indicator 2 enclosed within a tapered glass tube 3 marked at spaced intervals with indicating marks 4 for indicating rate of flow of air through the meter in terms of quantity per unit of time such as cubic feet per minute. The flow of air under pressure to be measured is admitted at the bottom of the tube 3 to flow through the tube to balance the float 2 at an indicating mark significant to the rate of flow and then to the top of the tube to the discharge passage 5 where the air under pressure is vented to atmosphere. An increase in the temperature of the air flowing through the flow meter above that of the temperature of air supplied from the source (in this case an air compressor), will cause the float 2 to balance at a higher mark than when the temperature of the air is the same as the temperature of the air from the source. This erroneous indication may be compensated for by increasing the air pressure in the tube 3 to cause the indicator float 2 to be lowered to the correct indicating mark. A valve 6 in the discharge passage 5 is provided to regulate the air pressure within the tube 3.

Associated with the flow meter 1 is a Wheatstone bridge arrangement including as one branch thereof a temperature responsive resistor 7 subject to atmospheric temperature and variable in resistance responsively to variation in atmospheric temperature. A second branch of the bridge arrangement includes a temperature responsive resistor 8 subject to the temperature of air at the flow meter inlet, said resistor 8 being variable in resistance responsively to variations in temperature of air at the flow meter inlet. A third branch of the bridge arrangement includes a pressure responsive resistor 9 of the carbon pile or similar type (shown on the drawing as a simple resistor) subject to atmospheric pressure and variable in resistance in accordance therewith. The fourth branch of the bridge arrangement includes a pressure responsive resistor 10 of the carbon pile or similar type (shown in the drawing as a simple resistor) subject to the pressure of air at the flow meter inlet, the resistance of said resistor 10 being variable in accordance with the variations in the air pressure at the flow meter inlet.

The second and fourth branches of the bridge arrangement, namely resistors 8 and 10 respectively, are located close together but in insulated relation at the flow meter inlet within a flanged pipe fitting 11. The resistors 8 and 10 may be inserted through an opening 12 in the fitting 11 and carried by an insulating spacer and seal 13 placed in the opening 12 and secured as by a threaded cap ring 14.

The first branch of the bridge, namely resistor 7, is joined at one end to a junction point 15. A wire 16 connects the junction point 15 to one end of resistor 8 in the second branch of the bridge. The opposite end of the first branch or resistor 7 is attached to the junction point 17 which is also connected to one end of resistor 9 of the third branch of the bridge. The opposite end of resistor 9 comprising the third branch of the bridge, is attached at a junction point 18 to a wire 19 leading to the one end of the fourth branch, namely resistor 10. The opposite end of the fourth branch or resistor 10 is connected by a wire 20 to a junction point 21. The opposite end of the second branch or resistor 8 is connected by a wire 22 to the junction point 21.

An alternating current voltage source such as a generator 23 supplies alternating current voltage to the bridge circuit at the junction points 17 and 21 by way of wires 24 and 25. Connected between the junction points 15 and 18 of the bridge circuit, as by wires 26 and 27, is an amplifier 28, hereinafter called servo amplifier 28.

Associated with the bridge circuits is an alternating current motor of the two phase induction type, hereinafter referred to as servomotor 29, comprising two similar stator windings and a rotor winding shown on the drawing as windings 30 and 31 and rotor 32 respectively. The winding 30 is supplied with a uniform alternating current from the generator 23 by way of wires 24 and 25 and wires 33 and 34. The winding 31 is supplied with the alternating current from the servo amplifier 28 via wires 35 and 36. A thorough understanding of the theory and operation of the servomotor 29 is not necessary to the understanding of the present invention, however, a brief description such as follows is of assistance. Briefly, the windings 30 and 31 are so connected with respect to the source of alternating current that a phase-shifting circuit results such that the windings are supplied with alternating currents equal in magnitude but 90 degrees apart in phase. As a result of such circuitry, the flux induced by each of the windings through the rotor 32 is equal in magnitude but 90 degrees out of phase, resulting in a zero speed of rotation of the rotor 32. If the voltage in either of the windings is varied to cause a voltage differential between the two windings, the higher voltage will overcome the lower voltage with a resultant rotation of the rotor 32 in a direction determined by the winding having the higher voltage. It is this theory upon which the applicant's circuitry is devised.

Connected to the rotor 32 by a rigid shaft (not shown) indicated on the drawing as a dotted line 38 is the discharge valve 6 of the flow meter 1.

The compressor apparatus utilized in the test comprises an air compressor 39 for supplying air under pressure to a measured volume such as a reservoir 40 by way of a pipe 41. A pipe 42 establishes an air pressure communication between reservoir 40 and a dampening reservoir 43. The pressure of air in the reservoir 40 and pipe 42 is controlled by a manually operated regulating valve 44 in the pipe 42. The regulating valve 44 is of the spring biased diaphragm type in which a diaphragm (not shown) is positioned by the air pressure in the reservoir 40 via a tube 45 to regulate the opening and closing of an orifice (not shown) in the pipe 42. As the air pressure in the reservoir 40 increases, the air pressure in the tube 45 acts on the diaphragm (not shown) within the regulating valve 44 to increase the opening of an orifice (not shown) in pipe 42 and thereby decreases the air pressure in the reservoir 40. Conversely, as the air pressure in the reservoir 40 decreases, the air pressure in the tube 45 decreases such that a spring (not shown) is permitted to bias the diaphragm (not shown) to a position to decrease the opening of the orifice (not shown) in the pipe 42 and thereby effect an increase in the air pressure in the reservoir 40. Thus, it can be seen that once the biasing pressure of the spring (not shown) has been adjusted manually, the pressure regulating valve 44 maintains a uniform air pressure in the reservoir 40. A pressure gauge 46 is connected to the tube 45 between the reservoir 40 and regulating valve 44 to indicate the air pressure in reservoir 40. The flanged pipe fitting 11 establishes communication between the discharge side of the dampening reservoir 43 and the flow meter 1.

Operation

To illustrate the operation of the novel gas flow meter with temperature correction, I have shown an air compressor efficiency test apparatus with which said meter is utilized. In operation, the air compressor to be tested, compressor 39, supplies air under pressure to the measured volume or reservoir 40 via pipe 41. As previously explained, a manually variable pressure regulating valve 44 in the discharge pipe 42 maintains a uniform air pressure in the reservoir, such pressure indicated on the pressure gauge 46 being preselected to a pressure uniform to the desired head against which the compressor is to be tested. Air under pressure flows from reservoir 40 through the pipe 42 and regulating valve 44 to a small pulsation dampening reservoir 43, thence through the flanged pipe fitting 11 passing over the resistors 10 and 8 to the flow meter 1 and through the flow meter to atmosphere past the discharge valve 6 in the discharge passage 5. As the air under pressure flows through the flow meter 1, the float 2 is positioned at the appropriate indicating mark 4 to indicate the rate of flow of such air under pressure from the compressor 39 through the flow meter 1 as previously described.

Due to the compression and friction of flow of the air under pressure flowing through the apparatus and the flow meter, the temperature of the air flowing through the flow meter is of higher degree than the air at the intake to the compressor 1, thereby resulting in expansion of the air under pressure through the flow meter 1 to give an inaccurate increased indication of the rate of flow of air from the compressor 39 through the flow meter 1. One way of correcting this erroneous indication is to regulate the discharge of the flow meter 1 to increase the air pressure in the flow meter a degree proportionate to the degree of temperature increase, which in turn reduces the indication of the rate of flow by the float 2.

The present invention regulates the discharge of the flow meter 1 automatically by the use of the normally balanced Wheatstone bridge arrangement previously described. Any increase in temperature of the air under pressure flowing to the flow meter causes a similar increase in temperature at the temperature responsive resistor 8 in the fitting 11 to thereby effect an increase in the resistance of the temperature responsive resistor 8 and cause unbalance in one direction of the Wheatstone bridge arrangement. It will be understood that the unbalanced voltage across junction points 15 and 18 of the Wheatstone bridge may be of one polarity or of the opposite polarity, and that therefore the term "direction" of unbalance of the bridge refers to the polarity of the unbalanced voltage of the Wheatstone bridge. As is common knowledge of the operation of a Wheatstone bridge, when the bridge is unbalanced in one direction or the other direction, a voltage of corresponding polarity and proportional to the degree of unbalance results between the junction points 15 and 18 to which the servo amplifier 28 is connected. The voltage through the servo amplifier 28 is amplified and supplied to the winding 31 of the servomotor via wires 35 and 36. It will thus be apparent that an increase in voltage of appropriate polarity applied to the winding 31 of the servomotor over the uniform voltage of the winding 30 effects a degree of rotation of the rotor 32 (as previously explained) dependent on the degree of voltage differential, and consequently proportionate degree of closing of the discharge valve 6 via shaft 38 to thereby effect an increase in the pressure of air flowing through the flow meter 1. The subsequent increase in air pressure in the flow meter due to the mentioned degree of closing of the discharge valve 6 results in an increase in the pressure of air acting on the pressure responsive resistor 10 of the bridge arrangement to thereby increase the resistance of the pressure responsive resistor 10 a degree proportionate to the amount of increase of air pressure thereby effecting a rebalancing of the bridge arrangement. With the bridge arrangement balanced, the voltage across the junction points 15 and 18 through the servo amplifier 28 is reduced such that the voltage through the winding 31 is equal in magnitude to that in winding 30 resulting in cessation of rotation of the rotor 32. With the stopping of the rotor 32, the closing of the connected discharge valve is also stopped in the partially closed position to maintain the increased air pressure in the flow meter thereby compensating for the temperature increase and reducing the indication of the float 2 to its corrected position thus enabling a direct temperature-compensated reading of the float 2 on the indicating marks 4.

Conversely, any decrease in temperature of the air under pressure flowing to the flow meter causes a similar decrease in the temperature at the temperature responsive resistor 8 to thereby effect a decrease in the resistance of the temperature responsive resistor 8 and cause the Wheatstone bridge arrangement to be unbalanced in an opposite direction to that previously described with the temperature increase. As is common knowledge of the operation of a Wheatstone bridge, when the bridge is unbalanced in the opposite direction, a voltage of opposite polarity and proportional to the degree of unbalance results between the junction points 15 and 18 to effect a supply of voltage of opposite polarity to the servomotor to operate the rotor 32 and connected discharge valve 6 in a manner similar to that described in the previous paragraph but in the opposite direction of rotation to thereby effect an opening movement of the discharge valve 6. Rebalancing of the bridge is effected in a manner converse to that described in the foregoing paragraph such that the float 2 is located in a corrected position compensating for the temperature decrease.

While the improved flow meter disclosed herein is illustrated and described in connection with air compressor efficiency test apparatus, it should be understood that the flow meter is capable of use in other applications and for measuring the flow of non-combustible gases other than air.

Having now described the invention, what I claim as new and desire to secure by Letters Patent, is:

1. A metering device for measuring the rate of flow of a gas, comprising, in combination, a gas flow metering means into which gas enters at one port and out of which gas is discharged at another port, valve means at the discharge port of said metering means operative to increase or decrease the pressure of gas flowing through the metering means and thereby correspondingly decrease or increase the reading thereof for a given rate of flow of gas therethrough, Wheatstone bridge resistance means, means applying a voltage thereto, one arm of said bridge including a temperature responsive resistance means in the stream of gas entering said metering means, said temperature responsive resistance means being effective responsively to an increase in the temperature of the gas entering said metering means to electrically unbalance said bridge and cause an unbalanced voltage to be developed on said bridge, motor means controlled according to the degree of unbalanced voltage on said bridge for correspondingly operating the said valve means to effect a decrease in the reading of said metering means to compensate for the increased temperature of the gas flowing through the metering means, and another arm of said bridge including a pressure responsive resistance means in the stream of gas entering said metering means responsive to the variations in pressure of the gas flowing through said metering means produced by said valve means for effecting an electrical rebalance of said bridge and a consequent stoppage of said motor means to stop the said valve means in a position in which it causes said metering means to register a rate of flow corresponding to the actual rate of flow of gas through said metering means.

2. A metering device for measuring the rate of flow of a gas, comprising, in combination, a transparent sight tube disposed vertically and having disposed therein a float means movable into different vertical positions within said tube to give a visible reading of the rate of flow therethrough responsively to volume of flow of gas therethrough, said tube having an inlet port at the bottom end thereof and a discharge port at the top end thereof, valve means in said tube adjacent the discharge port of said tube effective when moved toward a closed position to restrict flow through the discharge port and thus to correspondingly increase the pressure of gas flowing through the tube with corresponding lowering of the position of said float means and a consequent decrease in the indication of rate of flow registered by the float means, motor means for operating said valve means, and control means for said motor means, said control means including temperature responsive means responsive to an increase in temperature of the gas entering said tube for effecting a corresponding operation of said motor means to operate said valve means toward a closed position to cause an increase in pressure of gas flowing through the said tube to act on the said float means in a downward direction to compensate for the increased amount of flow which tends to be registered by the said float means within said tube due to the increase in temperature of the gas entering the said tube, and pressure responsive means responsive to said increase in pressure of the gas flowing through said tube for effecting cessation of operation of said motor means to stop operation of said valve means toward a closed position and cause said float means to locate at a position indicative of the rate of flow through said tube means notwithstanding variations of temperature of the gas flowing therethrough.

3. A metering device for measuring the rate of flow of a gas, comprising, in combination, a transparent sight tube disposed vertically and having disposed therein a float means movable into different vertical positions within said tube to give a visible reading of the rate of flow therethrough responsively to volume of flow of gas therethrough, said tube having an inlet port at the bottom end thereof and a discharge port at the top end thereof, valve means in said tube adjacent the discharge port of said tube operative to increase or decrease the flow through said discharge port to decrease or increase respectively the pressure of gas flowing through the tube and thereby correspondingly lower or raise respectively the position of said float means therein for a given rate of flow of gas therethrough, Wheatstone bridge resistance means, means applying a voltage thereto, one arm of said bridge including a temperature responsive resistance means in the stream of gas entering said tube, said temperature responsive resistance means being effective responsively to an increase or decrease in the temperature of the gas entering said tube to electrically unbalance said bridge and cause an unbalanced voltage of corresponding polarity to be developed on said bridge, motor means controlled according to the degree and polarity of unbalanced voltage on said bridge for correspondingly operating the said valve means to decrease or increase the flow through said discharge port to effect an increase or decrease respectively in the pressure of gas flowing through the tube to act on said float means to lower or raise respectively the positon of said float means in the said tube to compensate for the variation of temperature of the gas flowing through the tube, and another arm of said bridge including a pressure responsive resistance means in the stream of gas entering the said tube responsive to the variations in pressure of the gas flowing through said tube produced by operation of said valve means for effecting an electrical rebalance of said bridge and a consequent stoppage of said motor means to stop the said valve means in a position in which it causes said float means to locate in a position indicative of the rate of flow corresponding to the actual rate of flow of gas through said tube.

References Cited in the file of this patent

UNITED STATES PATENTS

| | | |
|---|---|---|
| 2,206,618 | Rheinlander | July 2, 1940 |
| 2,275,317 | Ryder | Mar. 3, 1942 |
| 2,488,221 | Moore | Nov. 15, 1949 |
| 2,650,607 | Bryant | Sept. 1, 1953 |
| 2,718,144 | Hornfeck | Sept. 20, 1955 |

FOREIGN PATENTS

| | | |
|---|---|---|
| 721,896 | Germany | June 22, 1942 |